(12) United States Patent
Glenn

(10) Patent No.: US 9,010,182 B1
(45) Date of Patent: Apr. 21, 2015

(54) RAIN GAUGE

(71) Applicant: Matthew S. Glenn, Lincoln, NE (US)

(72) Inventor: Matthew S. Glenn, Lincoln, NE (US)

(73) Assignee: Headwind Consumer Products, Syracuse, NE (US)

( * ) Notice: Subject to any disclaimer, the term of this patent is extended or adjusted under 35 U.S.C. 154(b) by 0 days.

(21) Appl. No.: 14/013,405

(22) Filed: Aug. 29, 2013

(51) Int. Cl.
*G01W 1/00* (2006.01)
*G01W 1/14* (2006.01)

(52) U.S. Cl.
CPC ........................................ *G01W 1/14* (2013.01)

(58) Field of Classification Search
USPC .......................................... 73/170.01–170.28
See application file for complete search history.

(56) References Cited

U.S. PATENT DOCUMENTS

| | | | |
|---|---|---|---|
| 5,038,606 A * | 8/1991 | Geschwender et al. | ... 73/170.17 |
| 6,494,089 B1 * | 12/2002 | Geschwender | ............ 73/170.21 |
| 6,609,422 B1 * | 8/2003 | Geschwender | ............ 73/170.22 |
| 7,152,468 B1 | 12/2006 | Peterson | |
| 7,401,508 B1 | 7/2008 | Peterson | |
| 7,536,907 B1 | 5/2009 | Peterson | |
| 2008/0223126 A1 * | 9/2008 | Geschwender | ............ 73/170.17 |

* cited by examiner

*Primary Examiner* — Andre Allen
(74) *Attorney, Agent, or Firm* — Dennis L. Thomte; Thomte Patent Law Office LLC

(57) ABSTRACT

A rain gauge comprising an elongated, transparent collection vessel or tube, having upper and lower ends, with the lower end thereof being closed by a plug and which has a funnel-shaped collector at the upper end thereof. The collection vessel includes rain measurement indicia thereon which glow in the dark. The vessel has a float contained therein which also glows in the dark.

8 Claims, 1 Drawing Sheet

U.S. Patent
Apr. 21, 2015
US 9,010,182 B1
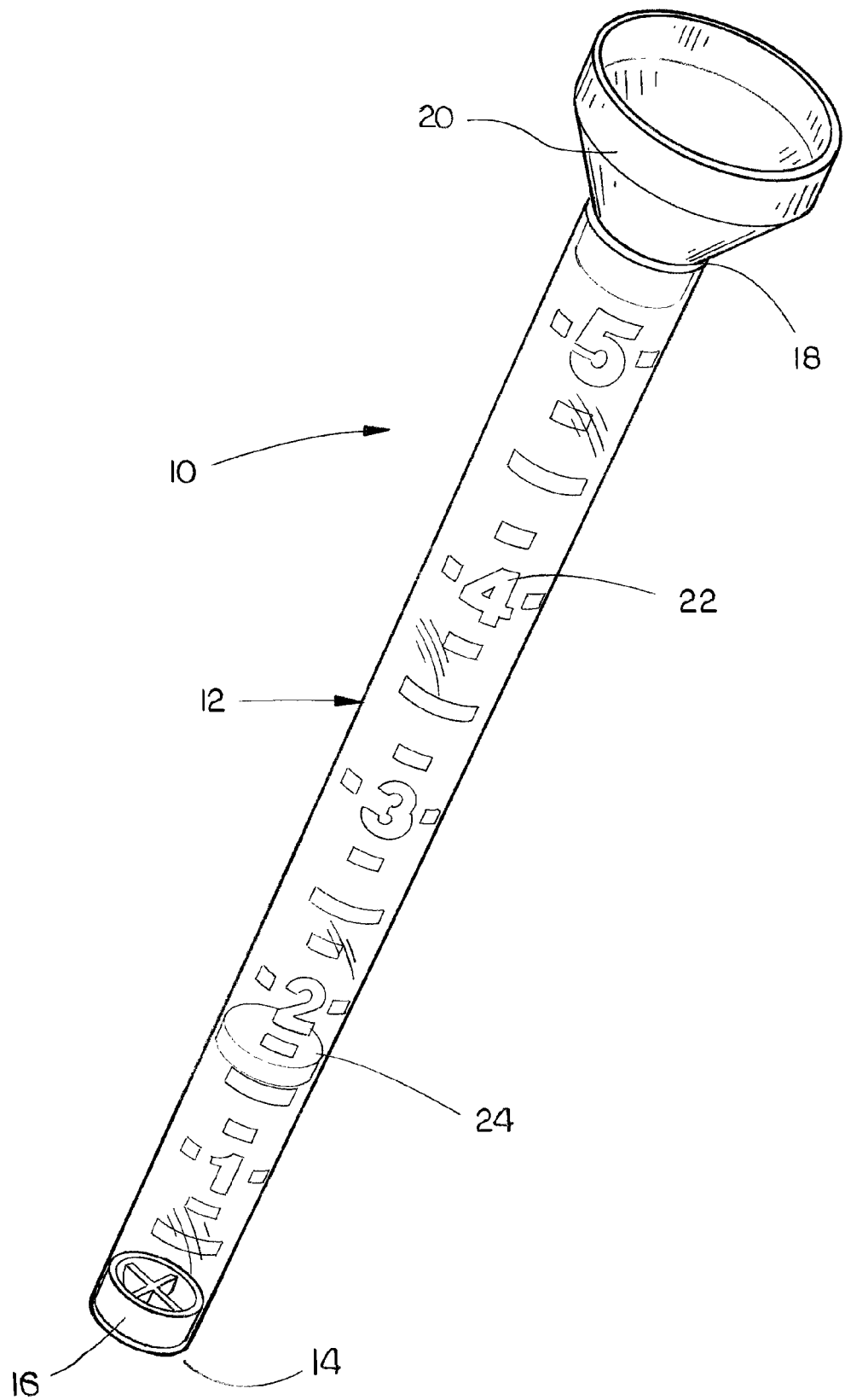

RAIN GAUGE

BACKGROUND OF THE INVENTION

1. Field of the Invention

This invention relates to a rain gauge and more particularly to a rain gauge having rain fall indicia thereon which glow in the dark to facilitate the observation of the same during periods of darkness.

2. Description of the Related Art

Many rain gauges have been previously provided and come in various shapes and forms. Further, many efforts have been made to facilitate the reading of the rain fall indicia on the rain gauges. For example, U.S. Pat. No. 5,038,606 discloses a "jumbo rain gauge" wherein the rain fall indicia thereon are enlarged so that the rain fall amount may be read from a distance. Although the rain gauge of the above-identified patent and other rain gauges of the prior art do enhance the readability of the rain fall indicia on the rain fall collection vessel, it is difficult, if not impossible, to read the same or observe the rain fall level within the collection vessels during periods of darkness.

The assignee of the present invention is the owner of U.S. Pat. Nos. 7,152,468; 7,401,508; and 7,536,907 which relate to illuminated rain gauges for facilitating the reading of the rain gauge during periods of darkness. Although the illuminated rain gauges of assignee's patents do function extremely well, the illumination means associated therewith increase the cost of manufacturing the rain gauge.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A rain gauge is disclosed comprising a transparent rain collecting vessel having rain fall indicia associated therewith. The rain fall indicia on the rain collecting vessel and the float therein glow in the dark to facilitate the observation of the rain fall level during periods of darkness. The glow in the dark material may be painted on the rain fall indicia or the rain fall indicia may be comprised of a glow in the dark phosphorescent material. The glow in the dark material may be paint, pigment or powder and may also be molded into the plastic vessel and the float if so desired.

It is therefore a principal object of the invention to provide a rain gauge wherein the rain fall indicia thereon and the float therein glow in the dark to facilitate the observation of the same during periods of darkness.

Yet another object of the invention is to provide a rain gauge which is economical of manufacture, durable in use and refined in appearance.

These and other objects will be apparent to those skilled in the art.

BRIEF DESCRIPTION OF THE DRAWINGS

Non-limiting and non-exhaustive embodiments of the present invention are described with reference to the following FIGURES, wherein like reference numerals refer to like parts throughout the various views unless otherwise specified.

FIG. 1 is a perspective view of the rain gauge of this invention.

DESCRIPTION OF THE PREFERRED EMBODIMENT

Embodiments are described more fully below with reference to the accompanying FIGURES, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The rain gauge of this invention is referred to generally by the reference numeral 10 and is similar to the rain gauge disclosed in U.S. Pat. No. 5,038,606 except for the fact that the rain collection vessel of the instant invention has rain fall indicia and a float which glow in the dark.

Rain gauge 10 includes an elongated hollow rain collection vessel 12 which is preferably constructed of a transparent plastic material. Collection vessel 12 includes an open lower end 14 which is closed by a plug 16. Vessel 12 also includes an open upper end 18 having a funnel-shaped collector 20 mounted therein. The vessel 12 is provided with printed rain fall measurement indicia 22 thereon, as seen in the drawings. The numeral 24 refers to a float which is positioned in the vessel 12.

The printed rain fall measurement indicia 22 may be painted with a glow in the dark paint or phosphorescent material. The printed indicia may be also be impregnated with a glow in the dark material. Further, the indicia with the glow in the dark material associated therewith may be molded into the vessel 12 at the time of the molding thereof. The float 24 is also either coated with a glow in the dark paint or may have the glow in the dark material impregnated therein during the molding of the float.

During periods of darkness, the glow in the dark indicia 22 and float 24 enable a person to visually determine the rain fall amount in the vessel 12.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A rain gauge, comprising:
   a transparent rain collection vessel having rain fall measurement indicia associated therewith;
   said indicia having a phosphorescent material associated therewith;
   a float positioned in said collection vessel;
   said float having a phosphorescent material associated therewith.

2. The rain gauge of claim 1 wherein the phosphorescent material associated with said indicia are painted onto said indicia.

3. The rain gauge of claim 1 wherein said rain collection vessel is comprised of a plastic material and wherein said indicia are molded into said collection vessel and wherein said phosphorescent material associated with said indicia are molded into said collection vessel.

4. The rain gauge of claim 1 wherein the phosphorescent material associated with said float is painted onto said float.

5. The rain gauge of claim 1 wherein said float is comprised of a plastic material and wherein said phosphorescent material is molded into said float.

6. A rain gauge, comprising:
   a transparent rain collection vessel having rain fall measurement indicia associated therewith;
   said indicia having a phosphorescent material associated therewith.

7. The rain gauge of claim 6 wherein the phosphorescent material associated with said indicia are painted onto said indicia.

8. The rain gauge of claim 6 wherein said rain collection vessel is comprised of a plastic material and wherein said indicia are molded into said collection vessel and wherein said phosphorescent material associated with said indicia are molded into said collection vessel.

\* \* \* \* \*